United States Patent
Clary

(10) Patent No.: US 6,702,034 B2
(45) Date of Patent: Mar. 9, 2004

(54) ROCK PICKER

(76) Inventor: Thomas W. Clary, P.O. Box 185, Milford, IA (US) 51351

( * ) Notice: Subject to any disclaimer, the term of this patent is extended or adjusted under 35 U.S.C. 154(b) by 0 days.

(21) Appl. No.: 10/062,653

(22) Filed: Jan. 30, 2002

(65) Prior Publication Data

US 2003/0141084 A1 Jul. 31, 2003

(51) Int. Cl.$^7$ ............................................. A01D 15/00
(52) U.S. Cl. ........................... 171/82; 171/144; 171/46; 171/44
(58) Field of Search ................... 171/144, 141, 171/82, 46, 44, 7, 11, 143, 105, 107, 110, 111

(56) References Cited

U.S. PATENT DOCUMENTS

| | | | | |
|---|---|---|---|---|
| 1,447,196 A | * | 3/1923 | Williams | 56/473.5 |
| 1,472,300 A | * | 10/1923 | Jannelle | 171/115 |
| 2,167,044 A | * | 7/1939 | Henderson | 171/89 |
| 2,491,079 A | * | 12/1949 | Bestland | 171/44 |
| 2,519,136 A | * | 8/1950 | Jochim | 171/86 |
| 2,523,263 A | * | 9/1950 | Anderson | 171/101 |
| 2,618,917 A | * | 11/1952 | Howser | 298/23 R |
| 2,636,328 A | * | 4/1953 | Jochim | 171/44 |
| 2,738,633 A | * | 3/1956 | Bestland et al. | 171/44 |
| 3,082,828 A | * | 3/1963 | Schindelka | 171/63 |
| 3,356,158 A | * | 12/1967 | Deaver et al. | 171/63 |
| 3,392,790 A | * | 7/1968 | Bestland et al. | 171/63 |
| 3,557,877 A | * | 1/1971 | Hoffman | 171/63 |
| 3,643,821 A | * | 2/1972 | Viel | 414/697 |
| 4,040,489 A | * | 8/1977 | Hulicsko | 171/63 |
| 4,296,818 A | * | 10/1981 | Malinowski et al. | 171/63 |
| 4,301,869 A | * | 11/1981 | Dubois | 171/63 |
| 4,428,435 A | * | 1/1984 | Hubbard et al. | 172/328 |
| 4,606,413 A | * | 8/1986 | Hake | 172/328 |
| 4,625,809 A | * | 12/1986 | Moynihan | 172/178 |
| 4,667,712 A | * | 5/1987 | Hudson et al. | 144/195.1 |
| 5,305,834 A | * | 4/1994 | White | 171/63 |
| 6,041,866 A | * | 3/2000 | Smith | 171/63 |
| 6,367,646 B1 | * | 4/2002 | Hoagland et al. | 220/533 |

* cited by examiner

*Primary Examiner*—Victor Batson
(74) *Attorney, Agent, or Firm*—McKee, Voorhees & Sease, P.L.C.

(57) ABSTRACT

A rock picker for use with all terrain vehicles and lawn and garden tractors that has a generally horizontal movable frame with one or more operative wheels secured to the frame. The frame holds a rock holding receptacle that is tiltable for rock dumping. A towing tongue is mounted to the forward end of the frame. Also mounted to the frame in a position such that it can be moved from a rock pick up position to a rock unload position dumping the rocks into the rock holding receptacle is tiltable rock scoop. As the picker is towed forward, the scoop scoops up the rocks and it can be hydraulically activated to dump the rocks into the rock holding receptacle or basket. In turn, the rocks can be dumped from there once carried away from the area from which the rocks are cleared.

11 Claims, 4 Drawing Sheets

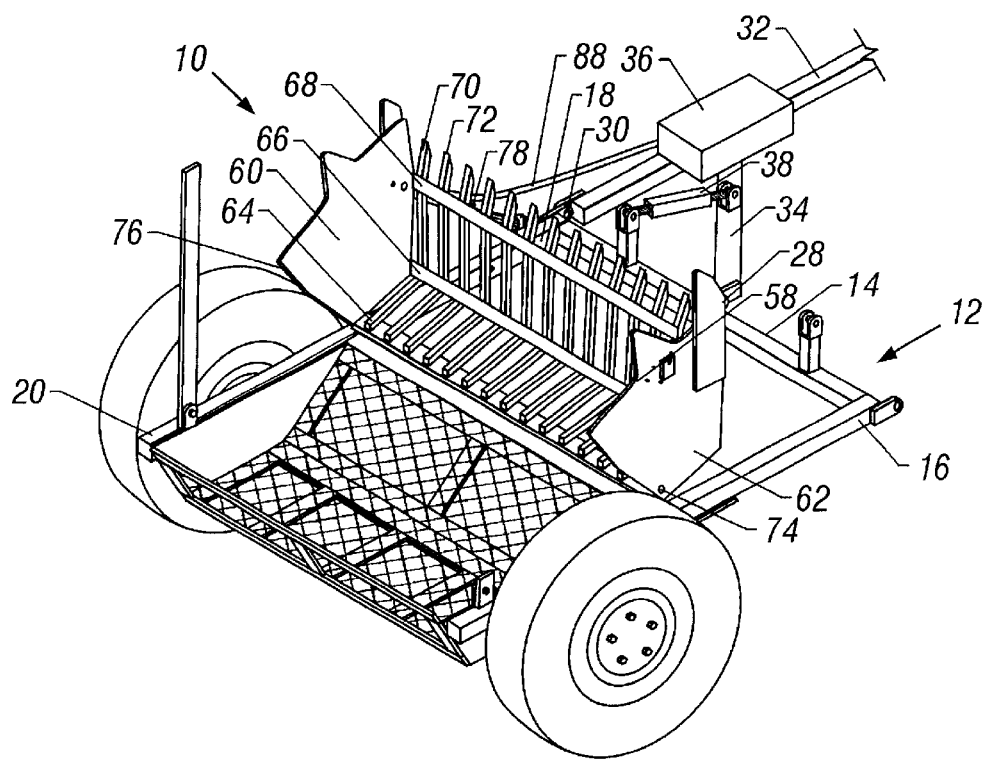
FIG. 3
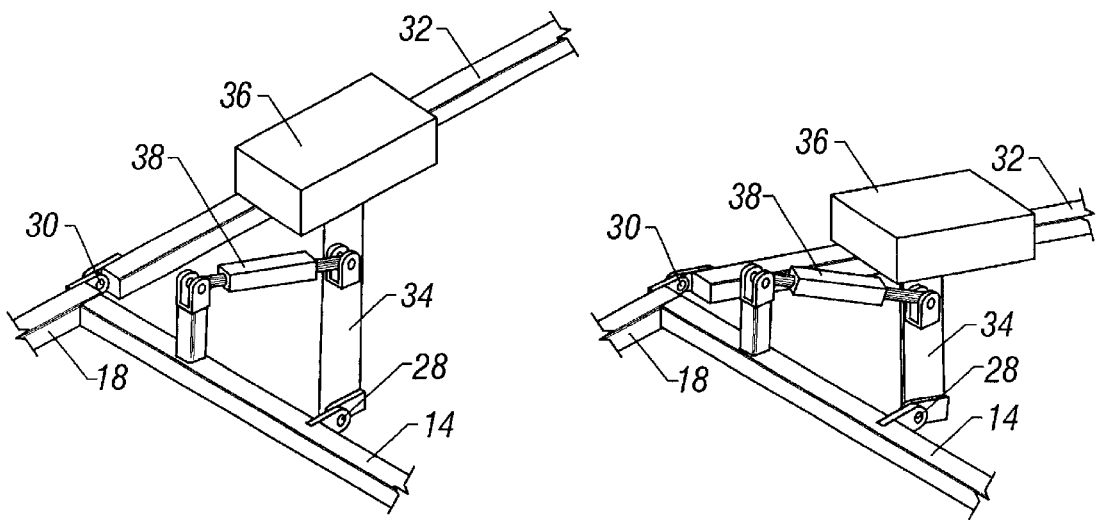
FIG. 4A  FIG. 4B

ROCK PICKER

BACKGROUND OF THE INVENTION

When land is leveled and cleared, for example for new home construction sites, it often happens that rocks are inevitably turned and rise to the top of the soil surface. These rocks must then be cleared before landscaping can occur. Currently, the most common way of clearing such rocks is manually. This is difficult, time consuming and often potentially back injuring.

While there have been some rock pick up units developed in the past, none have been of a suitable size and construction that they are conveniently available for use with for example, all terrain vehicles, or lawn and garden tractors. A unit of such size which automatically picked up rocks could save substantial time and eliminate a significant amount of labor.

Moreover, there is a continuing need for such a unit which will not only pick up the rocks, but allow convenient hauling and dumping of such rocks.

Another need is for a unit which will not only automatically pick up rock but allow sifting of soil through the unit so that soil is not removed along with the rock.

A still further need is for a rock picker which can be hydraulically activated, and also depth adjusted to allow for proper operation under a variety of terrain conditions.

The objectives of the present invention are to fulfill each of the above needs with a durable, versatile and preferably hydraulic activated rock picking unit.

SUMMARY OF THE INVENTION

A durable lightweight rock picker, preferably hydraulic and electrically activated, for scooping and then unloading rock from the scoop. The rock picker has a generally horizontally movable frame with wheels operatively secured to the frame. A rock holding receptacle is tiltably mounted towards the rear of the frame. Towards the front of the frame, and above the rock holding receptacle, is a tiltable and depth adjustable rock scoop which is pivotally mounted to the frame. The tiltable rock scoop can be moved from a rock load position, for scooping rock from the ground, as the frame is pulled forward to a rock unload position, for dumping rock from the scoop rear end into a rock holding receptacle or basket, which itself can then be dumped at a desirable location.

BRIEF DESCRIPTION OF THE DRAWINGS

FIG. 3 shows the rock picker with the rock scoop in its up dumping position.

FIGS. 4A and 4B show the three-point hitch and the towing arm turnbuckle which can be adjusted to remove the play and adjust to the height of the towing vehicle.

DETAILED DESCRIPTION OF THE INVENTION

Figure 1:
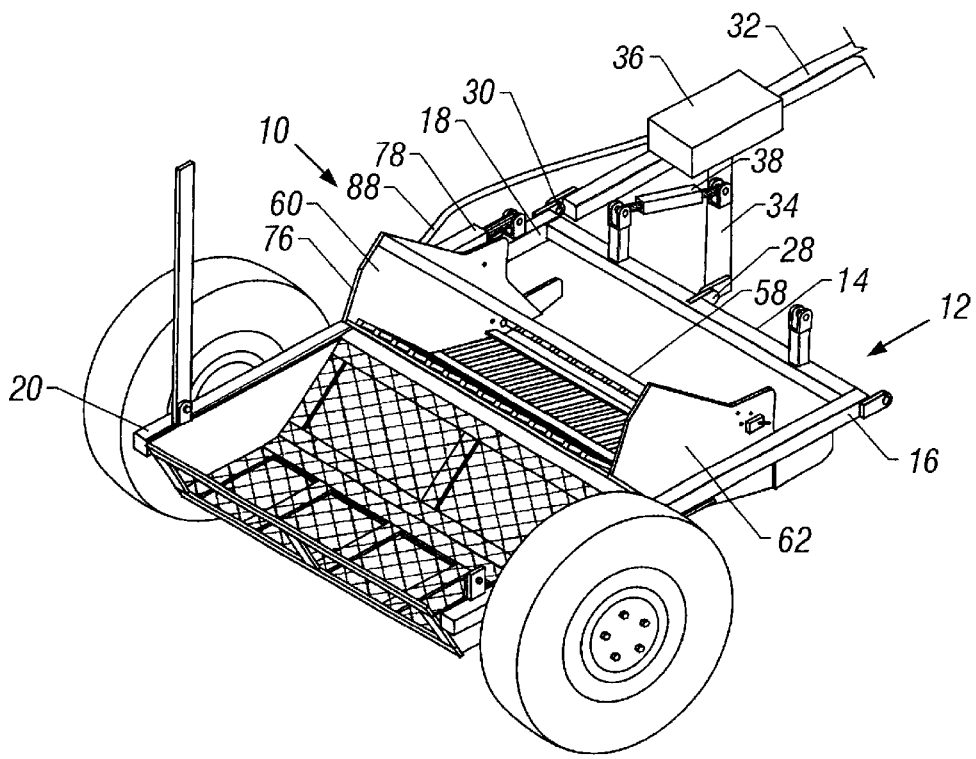
FIG. 1 is a perspective view of the rock picker of the present invention in ready to operate position.

With continuing reference to the drawings, the rock picker 10 has a generally horizontal movable frame 12. Frame 12 is comprised of a forward end piece 14, a pair of spaced apart frame sides 16, 18 and a rear frame end piece 20. The frame is movable by a conventional axle 22 and wheels 24, 26. Mounted to the front forward end 14 of frame 12 is hitch mount tab 28. A similar hitch mount tab is mounted at 30 on the forward end of frame 14. Tow bar 32 is mounted to hitch mount tab 30 and tow bar arm 34 is mounted to tab 28 at one end and tow bar 32 at its other end. Positioned on tow bar 32 is power unit box 36 which contains an electrical power unit to activate the hydraulic cylinder (not depicted) since it is of conventional construction. A turnbuckle 38 is mounted via brackets 40 and 42 such that the towing arm turnbuckle 38 can be adjusted to remove play and adjust to hitch height. Tow bar 32 pivots at hitch mount point 30 so it can move responsive to terrain and up down manner from generally horizontal, as illustrated in FIG. 4A to downwardly tilting as illustrated in FIG. 4B.

Figure 6:
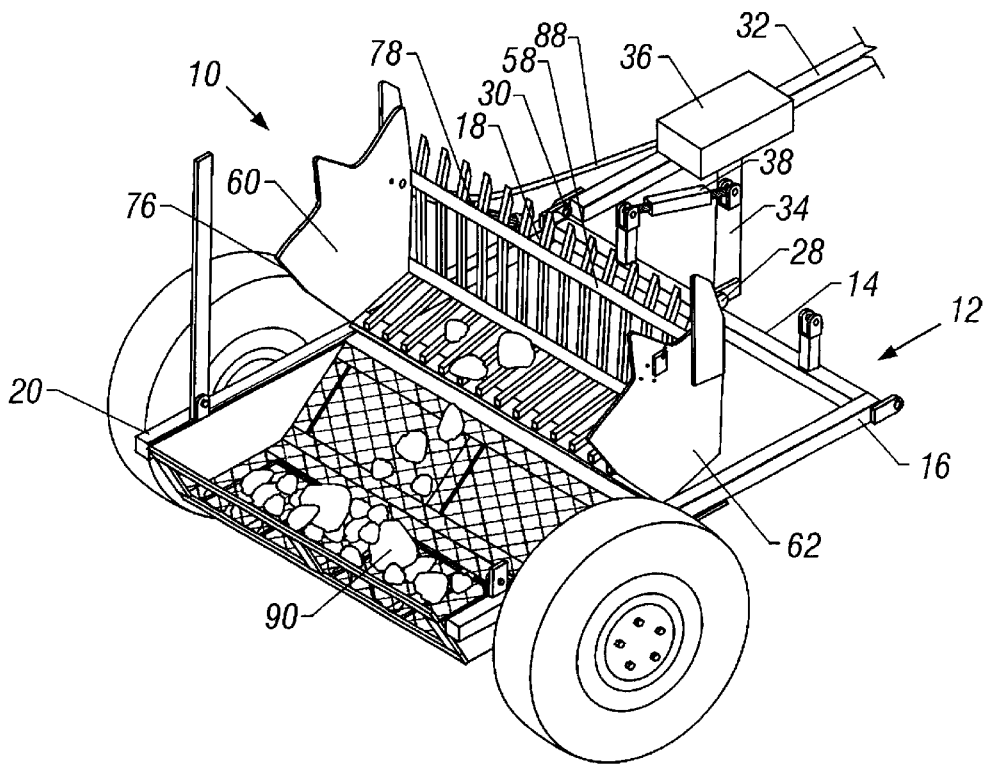
FIG. 6 shows rock being dumped from the scoop to the basket, with the scoop in an unload position.
Figure 7:
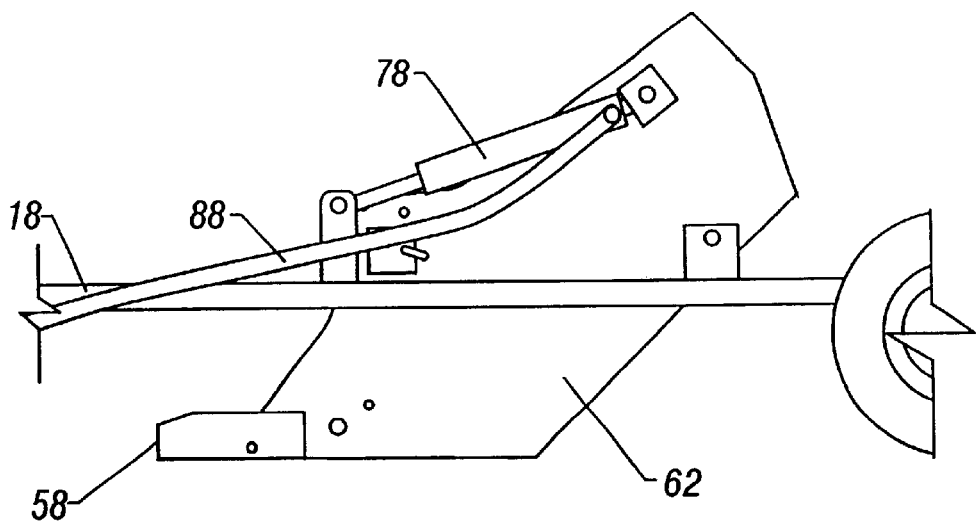
FIG. 7 shows a side view of the rock scoop in scooping position.

A rock holding basket 44 is mounted at the rear of frame 12, generally behind wheels 24 and 26. It is pivotally mounted to the frame via pivot point tabs 46 and 48. The rock basket 44 has a pair of spaced apart rock basket side plates 50 and 52 joined together by basket 54. Basket 54 is preferably of open weave configuration to allow rocks to be contained except for a certain small size which fall through. More importantly, the open weave allows soil to drop through, back to the ground. Mounted to side plate 50 is basket handle 56. As can be seen, a rearward pull on basket handle 56 will dump basket 44 backwards as it pivots about pivot points 46 and 48. This allows dumping of rock from the basket, as depicted in FIG. 6.

Positioned on movable frame 12 just forward and above rock basket 44 is rock scoop 58. Rock scoop 58 is comprised of a pair of spaced apart scoop side plates 60 and 62 connected together by scoop frame bars 64, 66 and 68. As can be seen, the rear end of rock scoop 58 is open. Parallel spaced apart tines 70 are attached to frame bars 66 and 68. They are removably attached so that tines 70, when worn, can be replaced. Tines 70 have forward flattened ends 72 to allow easy collection of rock and other material.

Figure 2:
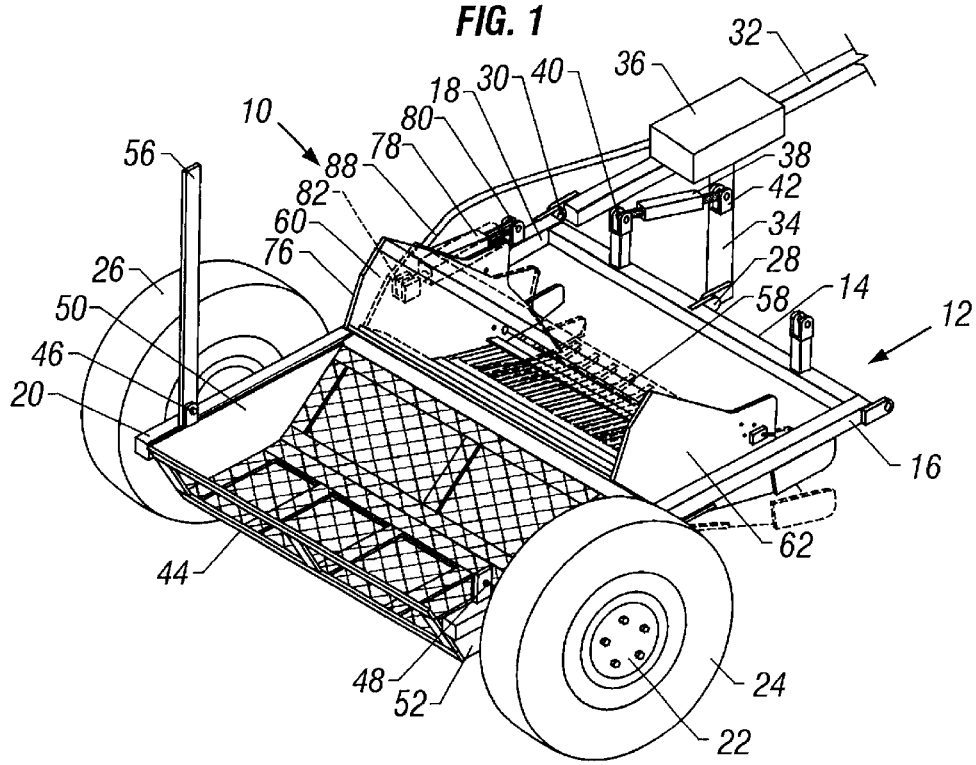
FIG. 2 shows the depth adjustment movement for the scoop, similarly in a perspective view.
Figure 8:
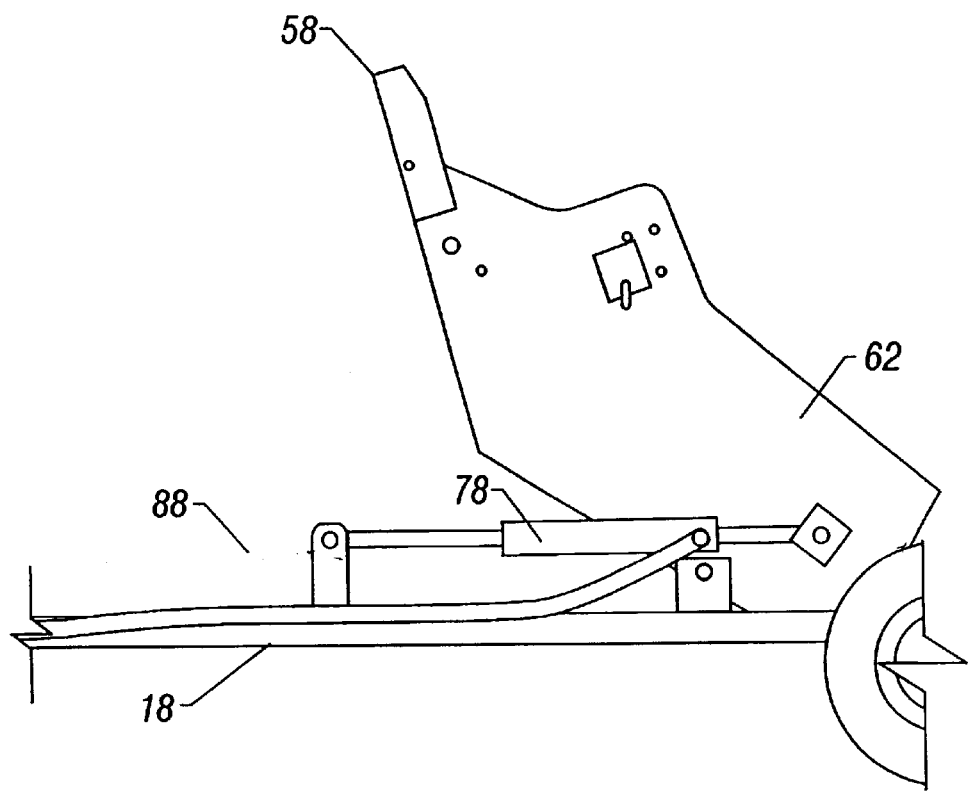
FIG. 8 shows a side view of the rock scoop in unload position.

Rock scoop 58 is tiltable with respect to the frame 12 since it is pivotally mounted to frame 12 at pivot points 74 and 76. Rock scoop 58 is shown in a rock load position in FIGS. 1, 2 and 5 and in a rock unload position in FIGS. 3 and 6. It is movable from the rock load position to the rock unload position by a hydraulic cylinder 78. Cylinder 78 is attached at one end to lower cylinder mount bracket 80 and at its upper cylinder end to upper cylinder tab 82 positioned on side plate 60. Therefore extension of hydraulic cylinder 78 will move rock scoop 58 from its load position of FIGS. 1, 2, 5, and 7 to its unload or dump position in FIGS. 3, 6 and 8 where the rock will be dumped from scoop 78 into rock basket 44.

Each rock scoop 58 side plate 60 and 62 has a depth adjustment block 84. The depth of the scoop relative to the frame and the ground surface can therefore be adjusted by simply pulling pin 86 and rotating depth adjustment block 84, for example, 90° and reinserting the pin 86. There are four adjustments shown but the block theoretically could have more adjustments if desired. When the pin is reinserted, the relative position of the scoop to the frame and the ground is adjusted. Obviously, both blocks 84 (one from each side) must be adjusted to the same level for the unit to work properly.

Figure 5:
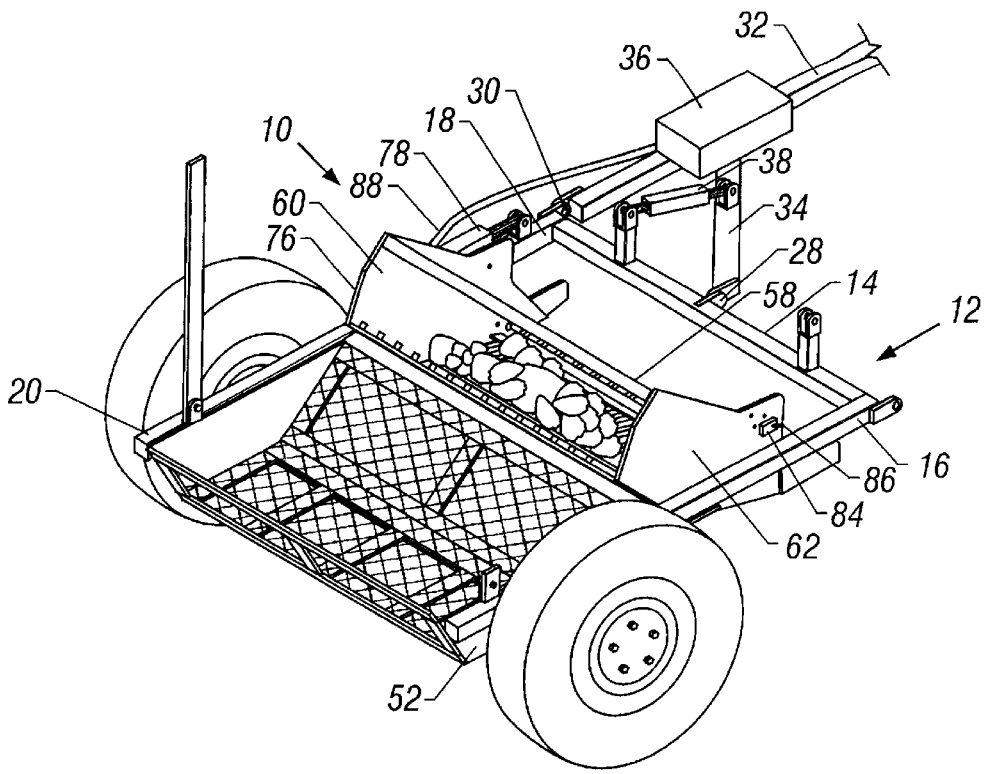
FIG. 5 shows the rock picker in towing and rock scooping position.

In actual operation, the unit works in the following manner. The operator hitches it to an all terrain vehicle by a tow bar arm 32 and a conventional hitch (not depicted). Any play in the unit is removed by adjustment of turnbuckle 38. The height of the unit relative to the ground is adjusted via depth adjustment blocks 84 and pin 86 and by turnbuckle 38. The unit is then operated over the surface of the ground in rock load position of FIG. 1. Rocks are loaded into scoop 58 as they are picked up by tines 70. When rock scoop 58 is full of rocks, as depicted in FIG. 5, an electrical power unit in power unit box 36 is activated and via hose 88 hydraulic cylinder 78 is extended so that rock scoop 58 is in the unload position of FIG. 6. Rocks 90 dump, therefore, into basket 44. When basket 44 is filled or its weight capacity is at its limit, the unit is moved to a rock storage area and basket handle 56 pulled backward and the rocks fall to the ground.

From the above description it can be seen that the unit accomplishes all of its stated objectives.

It goes without saying that modifications in the unit can be made. For example, while it is preferred that the rock basket 44 have an open weave to allow soil to sift therethrough, it could be a solid container or receptacle. Likewise, tines 70 can be larger or smaller tines and adjustably spaced apart, farther or closer, depending upon the size of rock one wishes to pick up or leave behind. The unit could, of course, be modified to be manually tiltable without the use of hydraulic cylinder 78, if one wishes. Likewise, depth adjustment could be accomplished by other conventional means if desired.

What is claimed is:

1. A rock picker for use with lawn and garden tractors, comprising:

a generally horizontal movable frame having a forward end, a rear frame end and spaced apart sides;

one or more wheels operatively secured to the frame;

a rock holding receptacle mounted to said frame;

a tow bar mounted to the forward end of said frame;

a tiltable rock scoop having a pair of scoop side plates and scoop frame joining the side plates, said tiltable rock scoop pivotally mounted to said frame and movable from a load position to an unload position;

said unload position being above said rock holding receptacle to allow for dumping of rock from said scoop into said holding receptacle; and said tiltable rock scoop having a depth setter attached to the side plates allowing the tiltable rock scoop to have its position relative to the horizontal frame and the ground adjusted.

2. The rock picker of claim 1 wherein said rock holding receptacle is an open weave basket.

3. The rock picker of claim 1 wherein the tow bar has a turnbuckle attached to it and the forward end of the frame to allow adjustable removal of play between a towing vehicle and the rock picker.

4. The rock picker of claim 1 wherein the tiltable scoop is movable from a load to unload position by a hydraulic cylinder attached to said scoop and said horizontal frame.

5. The rock picker of claim 4 having a storage box mounted to the tow bar.

6. The rock picker of claim 5 wherein a battery for electric activation of the hydraulic cylinder is mounted in the storage box and electrically connected to the cylinders.

7. The rock picker of claim 1 wherein said tiltable rock scoop has a plurality of forward extending spaced apart tines.

8. The rock picker of claim 7 wherein said spaced apart tines are removable tines.

9. The rock picker claim 7 wherein the forward end of said spaced apart tines are flattened to allow easy collection of rocks.

10. The rock picker of claim 1 having a storage box mounted to the tow bar.

11. The rock picker of claim 1 wherein the depth setter is an adjustment block.

* * * * *